United States Patent
Russke

(10) Patent No.: US 7,134,708 B2
(45) Date of Patent: Nov. 14, 2006

(54) CONVERTIBLE

(75) Inventor: Klaus Russke, Bissendorf (DE)

(73) Assignee: Wilhelm Karmann GmbH, Osnabrück (DE)

( * ) Notice: Subject to any disclaimer, the term of this patent is extended or adjusted under 35 U.S.C. 154(b) by 0 days.

(21) Appl. No.: 10/531,683

(22) PCT Filed: Oct. 13, 2003

(86) PCT No.: PCT/DE03/03398

§ 371 (c)(1),
(2), (4) Date: Apr. 15, 2005

(87) PCT Pub. No.: WO2004/037586

PCT Pub. Date: May 6, 2004

(65) Prior Publication Data

US 2005/0280281 A1 Dec. 22, 2005

(30) Foreign Application Priority Data

Oct. 17, 2002 (DE) .............................. 102 48 348
Oct. 17, 2002 (DE) .............................. 102 48 349
Oct. 17, 2002 (DE) .............................. 102 48 350

(51) Int. Cl.
*B60J 7/14* (2006.01)

(52) U.S. Cl. ............ 296/108; 296/107.07; 296/107.17; 296/107.18; 296/222; 296/215

(58) Field of Classification Search ............... 296/108, 296/107.07, 107.17, 107.18, 107.2, 220.01, 296/216.01, 222, 215
See application file for complete search history.

(56) References Cited

U.S. PATENT DOCUMENTS

| | | | |
|---|---|---|---|
| 2,768,025 A | 10/1956 | Spear et al. | |
| 5,078,447 A * | 1/1992 | Klein et al. | ............... 296/107.2 |
| 5,195,798 A * | 3/1993 | Klein et al. | ............ 296/107.07 |
| 5,803,534 A * | 9/1998 | Murkett et al. | ............. 296/222 |
| 2002/0074832 A1* | 6/2002 | Schutt et al. | .......... 296/220.01 |
| 2002/0135200 A1* | 9/2002 | De Gaillard | ............. 296/107.2 |
| 2005/0104412 A1* | 5/2005 | Perakis | ................... 296/107.18 |
| 2005/0140164 A1* | 6/2005 | Wilms et al. | .......... 296/107.18 |

FOREIGN PATENT DOCUMENTS

| | | |
|---|---|---|
| DE | 36 16 017 | 11/1987 |
| DE | 3616017 A1 * | 11/1987 |
| DE | 41 00 677 | 8/1991 |
| DE | 40 38 074 | 10/1991 |
| DE | 202 01 411 | 4/2002 |
| EP | 0 899 142 | 3/1999 |
| EP | 1332902 A1 * | 8/2003 |

* cited by examiner

*Primary Examiner*—Jason Morrow
(74) *Attorney, Agent, or Firm*—Friedrich Kueffner

(57) ABSTRACT

A convertible having a roof is provided with stiff parts, at least one rear roof part, and an upper roof part, which is mounted in front of the rear roof part relative to the direction of travel in the closed state and is located above a passenger area. The upper roof part of the convertible encompasses an at least substantially transparent plate member which can be displaced counter to the direction of travel like a sliding roof; is held parallel to a rear window that is embraced by the rear roof part in the open position thereof; and can be moved along with the roof in the parallel position in order to be opened and closed.

10 Claims, 14 Drawing Sheets

CONVERTIBLE

BACKGROUND OF THE INVENTION

1. Field of the Invention

The invention concerns a convertible.

2. Description of the Related Art

DE 42 03 228 C2 describes a convertible roof with a rear roof part that comprises a rear window and two lateral frame parts arranged in front of the rear roof part in the direction of travel of the vehicle. A front roof part that can be moved longitudinally relative to the two lateral frames is guided on these frames. This front roof part can be moved like a sunroof in the lateral guides, and it remains completely in the guides even in its open position. This limits the size of the roof opening formed by the sunroof opening. To allow the roof to be lowered further, the rear roof part is first swung down; only then can the upper roof part that encloses the sunroof open and rest on the rear roof part. A mechanism for this is expensive. This requires at least one additional support of the lateral frame parts relative to the automobile body, here with the B-posts 6 and the C-posts 9 actually two supports on each side of the vehicle, which reduce the interior space and reduce visibility. The opening of the roof into the open position and the closing of the roof from the open position take a great deal of time.

SUMMARY OF THE INVENTION

The goal of the invention is to improve the ability to open the roof of a convertible with rigid roof parts and a sunroof.

In accordance with the invention, a large partial opening of the roof during driving is also made possible by the plate member of the upper roof part. This plate member acts as a sunroof. Due to the fact that the sunroof lies parallel to the rear window in the open position, almost the entire region between the windshield frame and the rear roof part can be freed in this open position. Visibility to the rear is ensured by the transparency of the plate member. The lowering mechanism of the roof to its full opening is speeded up, since the sunroof, at least in its open position, in which it is kept parallel to the rear window, can be let down simultaneously (rather than successively) with the opening rear roof part.

If the plate member, in both the open and closed position, is held by its front end region in a guide assigned to the upper roof part and by its rear end region in a guide assigned to the rear roof part, especially smooth opening and closing of the sunroof is obtained, since the sunroof does not have to pass through any step between several roof parts but rather remains assigned to the same roof parts in both the open and closed state.

The mounting of the front end region of the plate member in its open position by means of cantilever arms coaxially with an axis of a pivot joint, which joins the rear and upper roof parts, advantageously allows the plate member in its open position also to pivot with the rear roof part.

A pivot connection of the middle section, which encloses the rear window, on both the automobile body and the upper roof part makes it possible for the middle section enclosing the rear window to act as a pivot link. The pivot joint between the middle section and the upper roof part can be elevated in such a way that the plate member is displaced over the rear roof part, and in the process the sunroof can be held in the elevated joint. This increases head clearance and reduces the risk of injury by parts situated in this region.

In particular, if both the main posts and the middle section can act as pivot links between the automobile body and the upper roof part, a pair of links is already formed on each side of the vehicle, which makes it possible to realize advantageous roof lowering kinematics. Due to the individual swivelability of the middle section, on the one hand, and of the lateral main posts, on the other hand, the roof lowering movement can be adapted to the space conditions in the automobile body, since in the lowered position, the specified parts can be spaced apart from one another, and due to an elevated position of the middle section, additional trunk space can be obtained.

Other advantages and features of the invention are apparent from the embodiments of the object of the invention described below and illustrated in the drawings.

BRIEF DESCRIPTION OF THE DRAWINGS

FIG. 9 shows the roof kinematics in the closed roof position.

FIG. 10 shows the roof kinematics in the first opening phase, corresponding approximately to the opening position shown in FIG. 5.

FIG. 11 shows the roof kinematics in the opening position, corresponding approximately to the opening position shown in FIG. 6.

FIG. 12 shows the roof kinematics in the completely open position, corresponding to FIG. 7.

Figure 1:
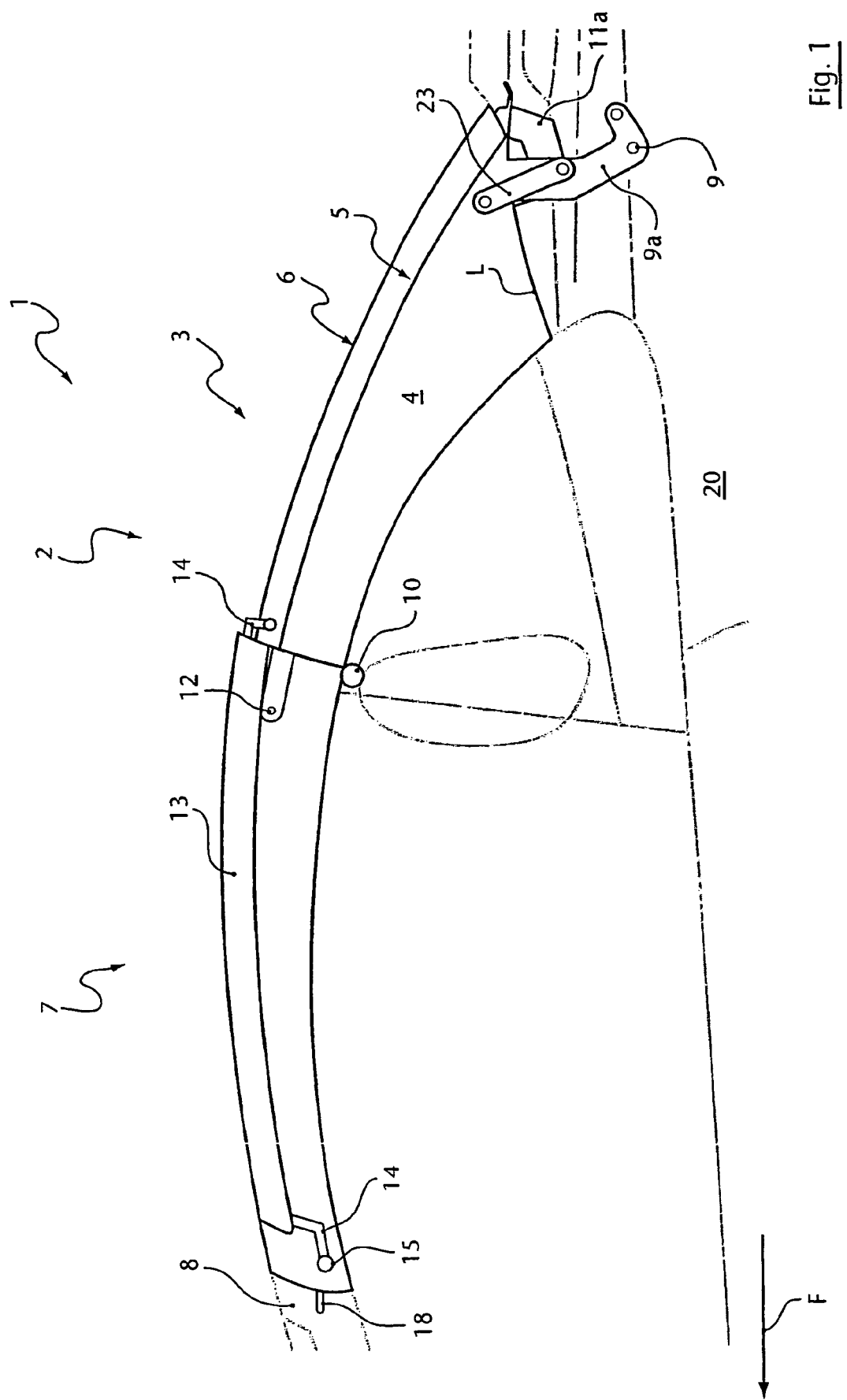
FIG. 1 shows a convertible of the invention in a schematic side view that is broken off below and at the front, with the roof closed and the plate member of the upper roof part closed.
Figure 2:
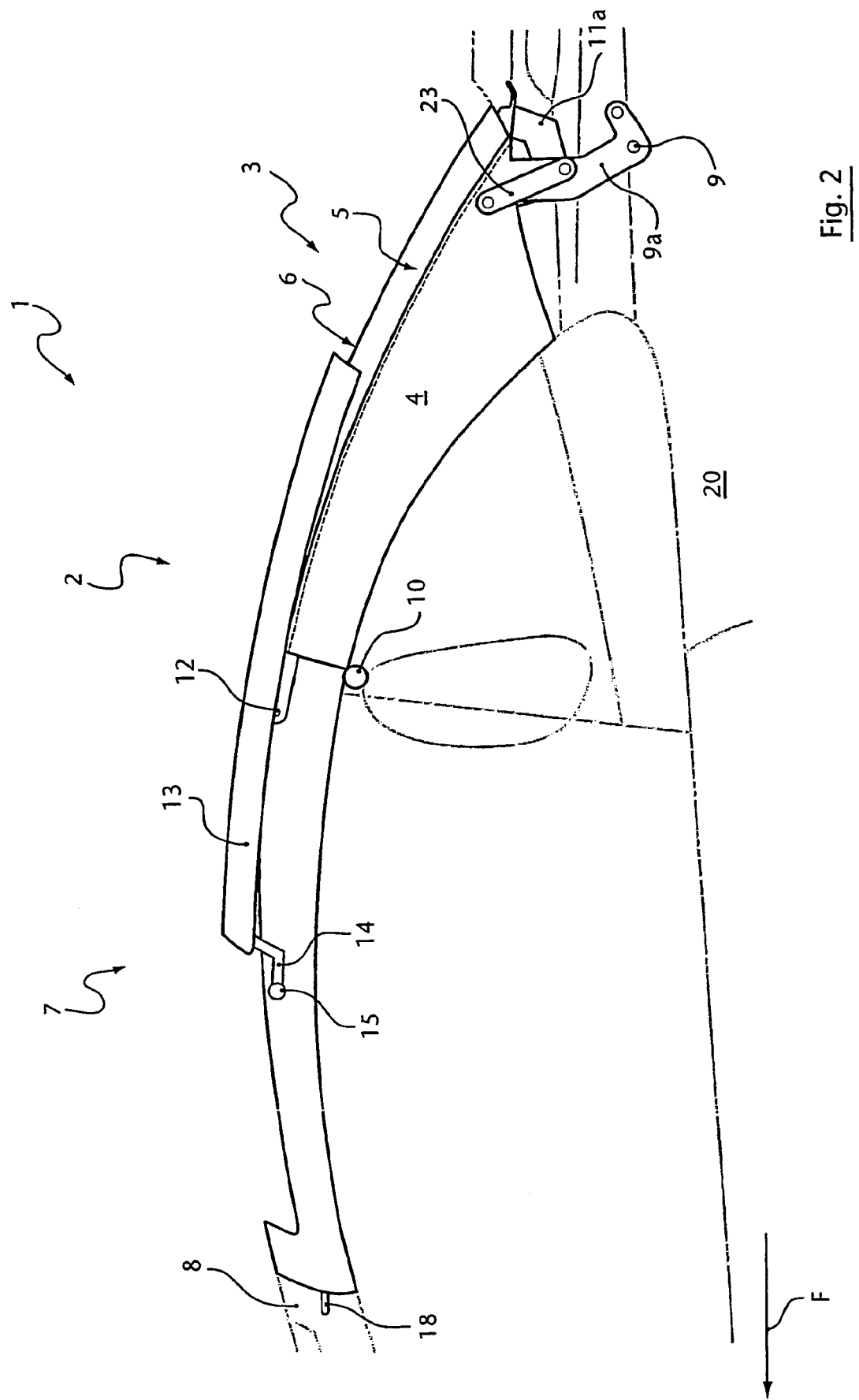
FIG. 2 shows a view similar to that of FIG. 1 in a partially opened position of the plate member, which acts as a sunroof.
Figure 3:
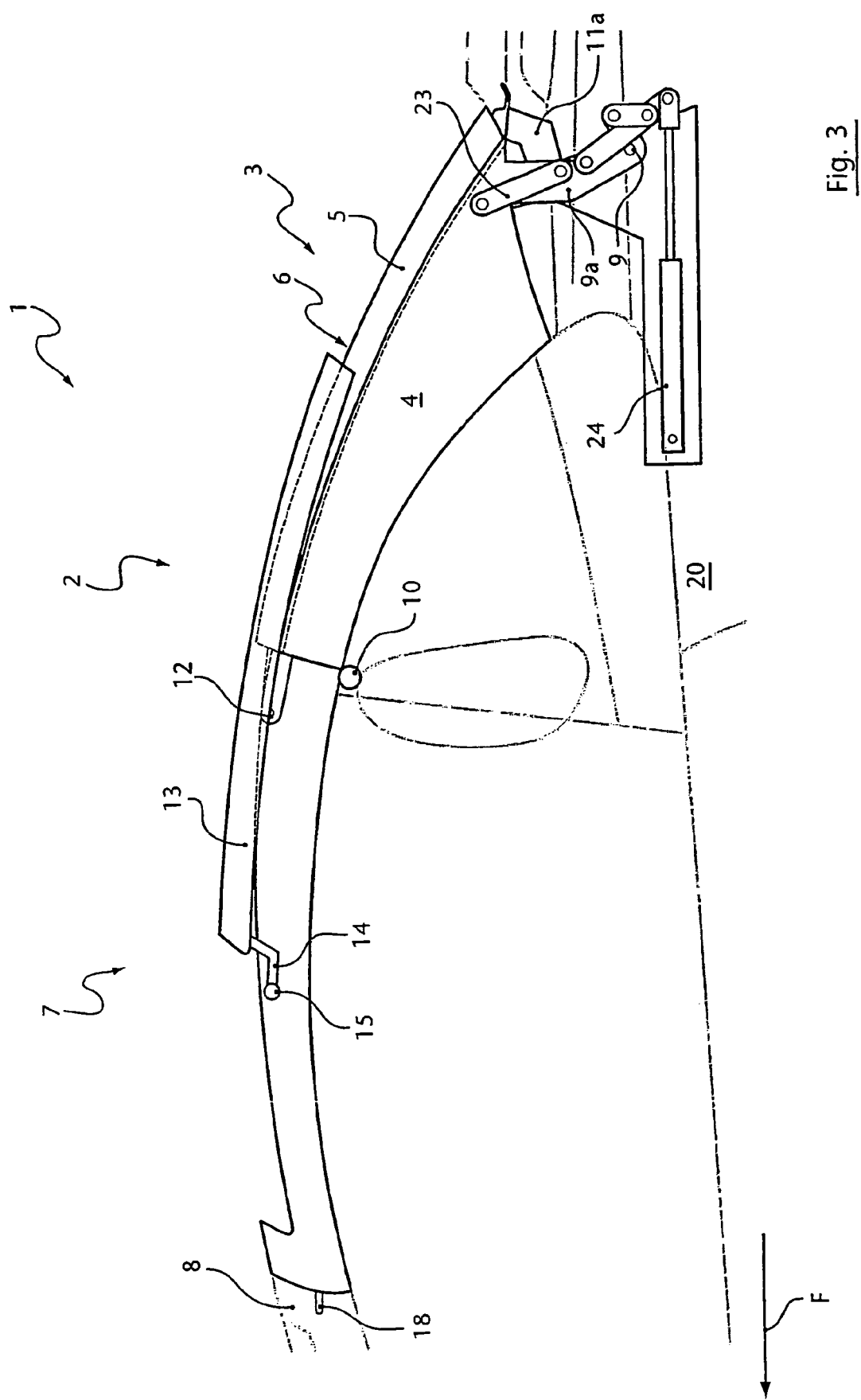
FIG. 3 shows a view similar to that of FIG. 2 with a drive and reduction gear train for moving the roof parts additionally shown.

The illustrated convertible 1 in accordance with the invention is a two-seater. A convertible with, say, two rows of seats one behind the other can also be constructed in accordance with the invention.

The vehicle 1 comprises a movable roof, which is labeled as a whole with 2 in FIGS. 1 to 13 and in FIGS. 14 to 18 with 102.

DETAILED DESCRIPTION OF THE INVENTION

The roof 2 according to the first embodiment comprises a rear roof part 3, i.e., a roof part that is located at the rear relative to the direction of travel F, with two lateral main posts 4 and a middle section 5 located between them. The middle section encloses or is essentially formed by a flexible or, especially, rigid rear window 6, which can be made, for example, of plastic or, advantageously, glass. Both the main posts 4 and the middle section 5 are rigid and therefore can transmit torques. The main posts 4 and a possible frame 5a of the middle section 5 can be made, for example, of steel, a light metal, a metallic foam material, or plastic. It is also possible for the main posts 4 to be transparent. Moreover, the main posts 4 can be supported by frame parts.

In addition, the roof 2 comprises an upper roof part 7, which, in the closed state, is arranged in front of the rear roof part 3 in the direction of travel F of the vehicle. In the illustrated embodiment with a two-seat vehicle 1, this upper roof part 7 is formed by a single member without further transverse division. In the closed state, the front end of the upper roof part 7 is directly or indirectly supported on the windshield frame 8. Like the main posts 4, the upper roof part 7 can be made of various materials. In addition, the member 7 supports a sunroof 13, which can be displaced essentially in the longitudinal direction of the vehicle and will be explained in greater detail below. The upper roof part 7 can comprise, besides the sunroof 13, only two lateral longitudinal supports, in which the sunroof 13 is guided, or the two lateral longitudinal supports can be connected by a forward transverse support, which borders on the windshield frame when the roof is closed, to form a structure with a U-shape as seen in a top view.

The main posts 4 are supported in their lower region by arms 9a relative to the automobile body 20 on pivot bearings 9, which are fixed with respect to the automobile body at least during the swiveling. Their bearing axes run horizontally and transversely to the vehicle 1. In their upper region, the main posts 4 are connected with the upper roof part 7, which is situated above a passenger compartment, on pivot joints 10, which also have horizontal bearing axes that extend transversely to the vehicle 1. When the roof is being opened, the main posts 4 and the upper roof part 7 fold towards each other about the axis of the pivot joints 10.

The lower region of the middle section 5 is supported by arms 11a relative to the automobile body 20 on one or more pivot bearings 11, which are fixed with respect to the automobile body at least during the swiveling. Their bearing axes run horizontally and transversely to the vehicle 1. In its upper region, the middle section 5 is connected with the upper roof part 7 on at least one pivot joint 12, which likewise has a horizontal bearing axis that extends transversely to the vehicle 1. In the present embodiment, two pivot joints 12 are provided, which are assigned to each side of the vehicle 1.

Figure 13:
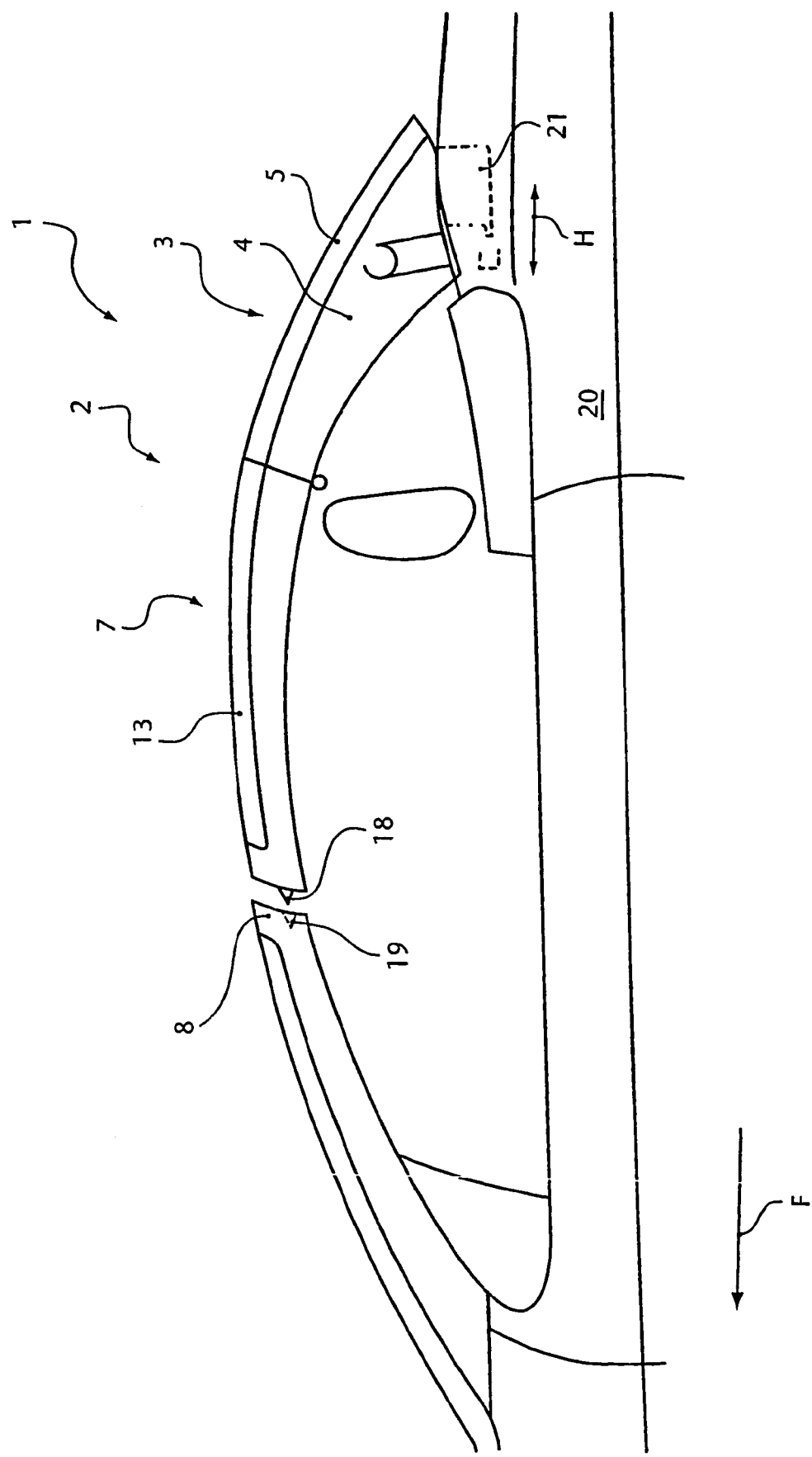
FIG. 13 shows a view similar to that of FIG. 1 with the roof as a whole displaced horizontally to the rear to release the catch between the front end of the roof and the windshield frame.
Figure 14:
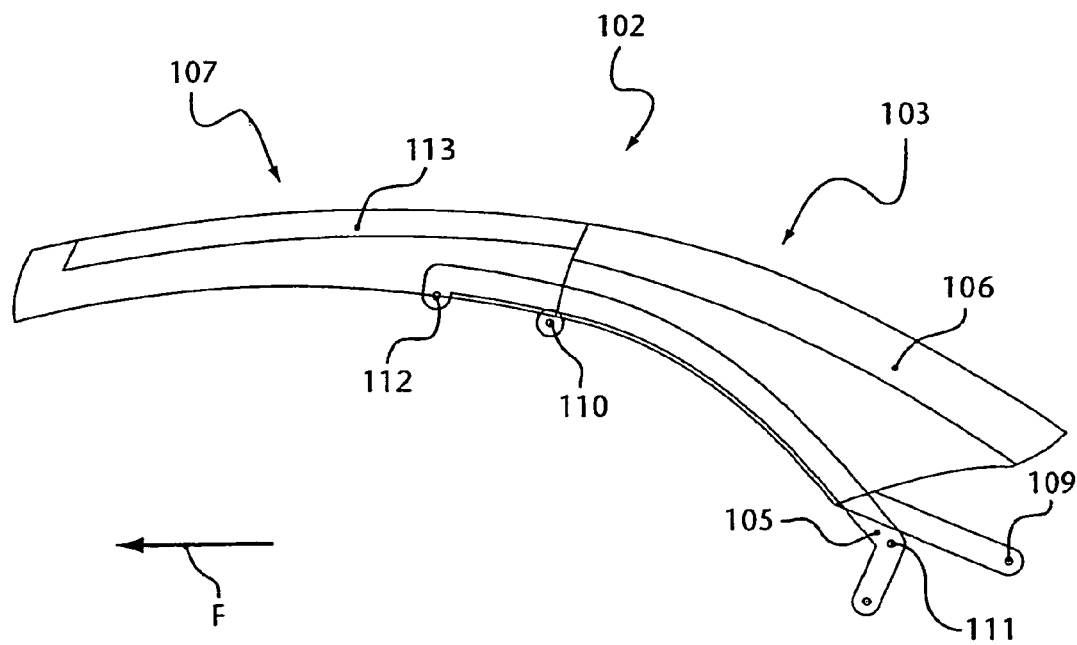
FIG. 14 shows an alternative folding roof design with a conventional link design in the closed position of the roof with the sunroof closed.
Figure 15:
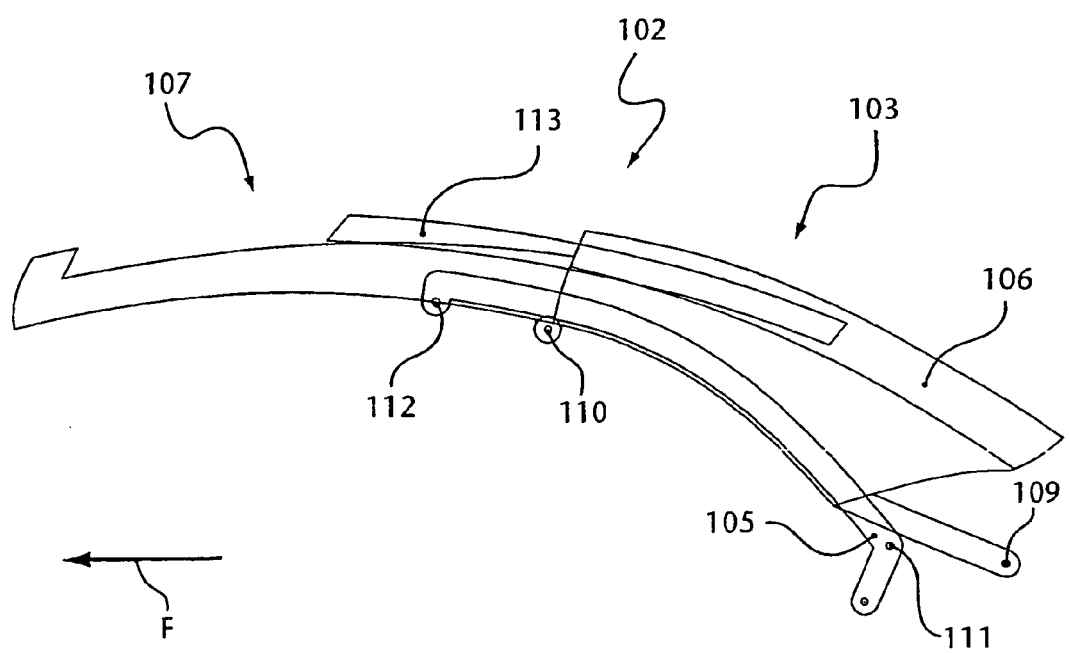
FIG. 15 shows the alternative folding roof design according to FIG. 14 with the roof in the closed position and the sunroof partially open.
Figure 16:
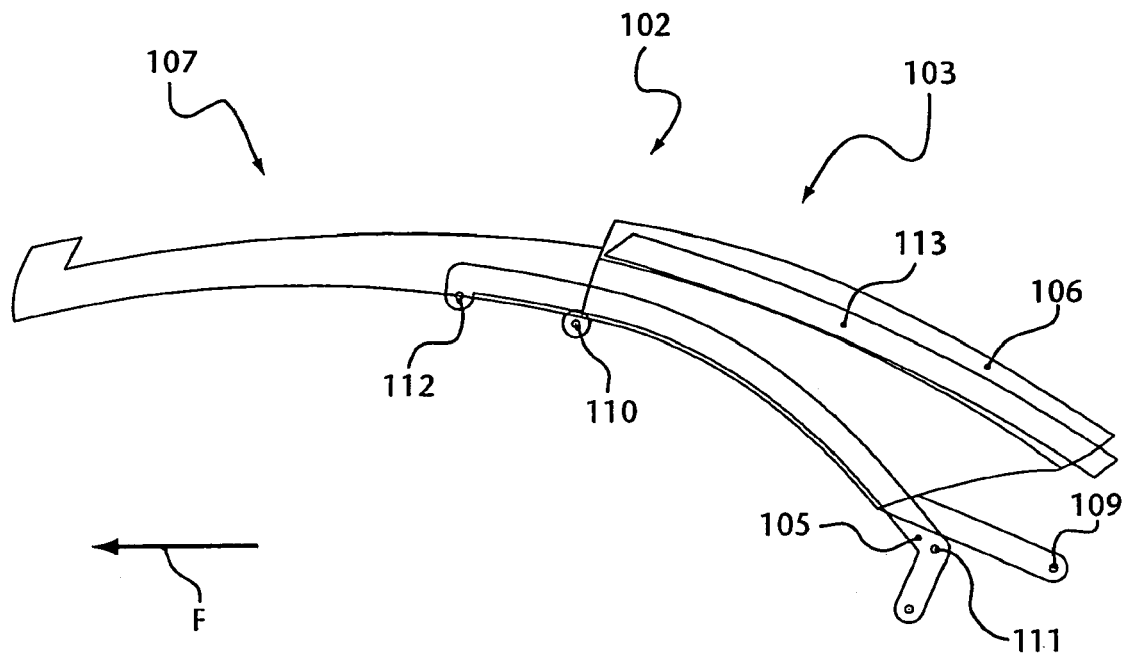
FIG. 16 shows a view similar to that of FIG. 15 with the sunroof completely open.

The pivot joints 11 and 12 of the middle section 5 each lie in planes above the planes of the pivot joints 9 and 10 of the lateral main posts 4. As will be explained in greater detail below, the pivot bearings 9 and 11 can optionally be fixed with respect to the automobile body during the swiveling but can be displaced horizontally or almost horizontally between a closed roof position (FIG. 1) and an extreme rearward position suitable for swiveling (FIG. 13). This applies in principle to all of the embodiments.

The front roof part 7 comprises a displaceable plate member 13, which can be opened like a sunroof and displaced over the rear roof part 3 (FIGS. 2, 3, 4, 5, 6, 7, 8). The place member 13 is made of a transparent plastic or glass, so that even when it has been moved over the rear window 6, the view to the rear is not obstructed. It has lateral arms 14, which engage lateral guideways 16 of the upper roof part 7 by means of bearing journals 15 or similar guide elements. In addition, guide rails 17 are provided on the middle section 5 of th rear roof part 3 (FIG. 8), which guide the plate member 13 into a position parallel to the rear window 6 and can hold it there. In the closed position, the plate member 13 engages both the guideways 16 by means of the arms 14 arranged in the front region and the rear guide rails 16 by means of other arms 14a (shown schematically only in FIG. 1). Therefore, the roof 2 cannot be opened in the embodiment shown in FIGS. 1 to 13 until the sunroof 13 has been opened, since otherwise the sunroof 13 would block the folding of the roof parts 3 and 7 towards each other.

For sealing, an upwardly projecting sealing edge is assigned to the upper edge of the rear roof part 3, and a downwardly directed opposing edge that grips behind the sealing edge of the rear roof part 3 is assigned to the rear edge of the plate member 13. In the closed state of the sunroof 13, the sealing edge and the opposing edge are in contact with each other.

Even in the open position of the plate member 13 that acts as a sunroof, in which it is displaced to the rear by the maximum amount, the plate member 13 is still held in the guide rails 17 of the rear roof part 3 and, by means of its arms 14, in the guideways 16 of the upper roof part 7. The end point of the guideways 16 lies on the pivot axis of the upper pivot joint 12, with which the middle section 5 engages the upper roof part 7, which makes it possible for the roof 2 to be opened and closed with the sunroof 13 open (see, e.g., FIG. 5). A program control can be provided, which ensures that the roof 2 can be opened or closed only with the sunroof 13 completely open. Due to the fact that the sunroof 13 remains with both its front arms and its rear arms in the respective guides 16, 17, it is not necessary to overcome any step during the opening of the sunroof 13. Therefore, the opening operation can be carried out especially smoothly and reliably, even after an extended vehicle life. During the movement of the sunroof 13, neither a front arm 14 nor a rear arm 14a of the sunroof 13 must leave the guide 16 or 17 that is guiding it. Therefore, a possible misalignment of the guides 16, 17 caused by production tolerances is irrelevant to the movement of the sunroof 13.

Alternatively, it would also be possible for the plate member 13 to be held in its closed state only on the upper roof part 7 and in its open state to be transferred completely to the rear roof part 3, as is shown in detail as an example in FIGS. 14 to 18 for another embodiment. It would then be possible to open the roof with the sunroof 13 either completely open or completely closed, as will be explained in greater detail below.

In the first embodiment (FIGS. 1 to 13); the middle section 5 consists of a support frame 5a and a transparent plate member mounted on it, which serves as the rear window 6. This plate member can possibly support the guide rails 17 for the sunroof 13. Many other designs are also possible, possibly also with a frame, in the middle of which the rear window is situated, or with arms 11a welded directly onto a rear window.

To secure the front roof part 7 on the windshield frame 8, pins 18 are assigned to the roof part 7, which are located approximately in its extension plane and are directed in travel direction F in the closed state of the roof. The pins 18 fit into complementary recesses 19 of the windshield frame 8. The pins 18 and the recesses 19 can be conically shaped to facilitate centering of the closing roof 2. An additional securing mechanism is not absolutely necessary if a securing mechanism of the displaceable main bearing 21 explained in the next paragraph is provided.

In the aforementioned optional design, the pivot bearings 9, 11 for the parts 4, 5 are fixed with respect to the automobile body and are mounted as a whole in a lateral main bearing 21, which can be displaced relative to the automobile body 20 horizontally or almost horizontally in the longitudinal direction of the vehicle. A drive mechanism 22, say, a hydraulic cylinder, a shaft, an electric motor or the like, is assigned to each of these main bearings 21. Each of the main bearings 21—and thus the roof 2 supported on them—can be moved by this drive mechanism 22 horizontally in the direction of arrow H (transition from FIG. 1 to FIG. 13) between a front extreme position with the roof completely closed and a rear extreme position (FIG. 13), in which the roof 2 has been displaced in the direction opposite the direction of travel F to such an extent that the pins 18 have come out of the recesses 19 of the windshield frame 8. In this position, the roof 2 can pivot freely about the bearings 21 without there being any danger of the front tip of the roof colliding with the windshield frame 8.

The roof parts 3, 7 are coupled with each other by a coupling element 23 for their movement about the main bearings 21, which are mounted laterally in the automobile body 20. The coupling element 23 extends between arms 9a and 11a, which connect the pivot bearing 9 with a main post 4 and the pivot bearing 11 with the middle section 5. Therefore, one drive 24 for each side of the vehicle (FIG. 3a) is sufficient for producing a uniform swiveling movement about the bearings 9 and 11.

Figure 4:
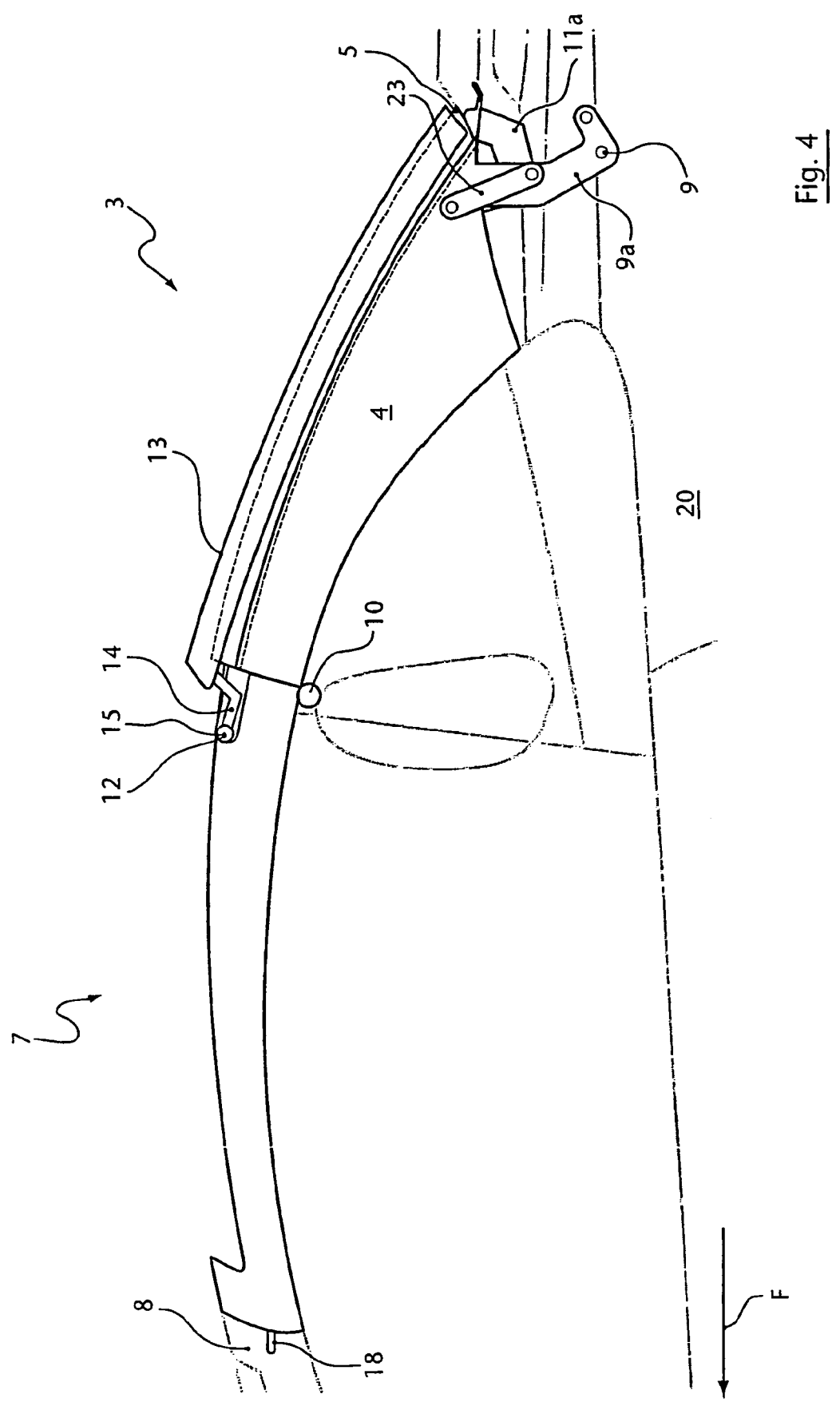
FIG. 4 shows a view similar to that of FIG. 2 with the plate member in its completely open position but with the roof otherwise closed.
Figure 5:
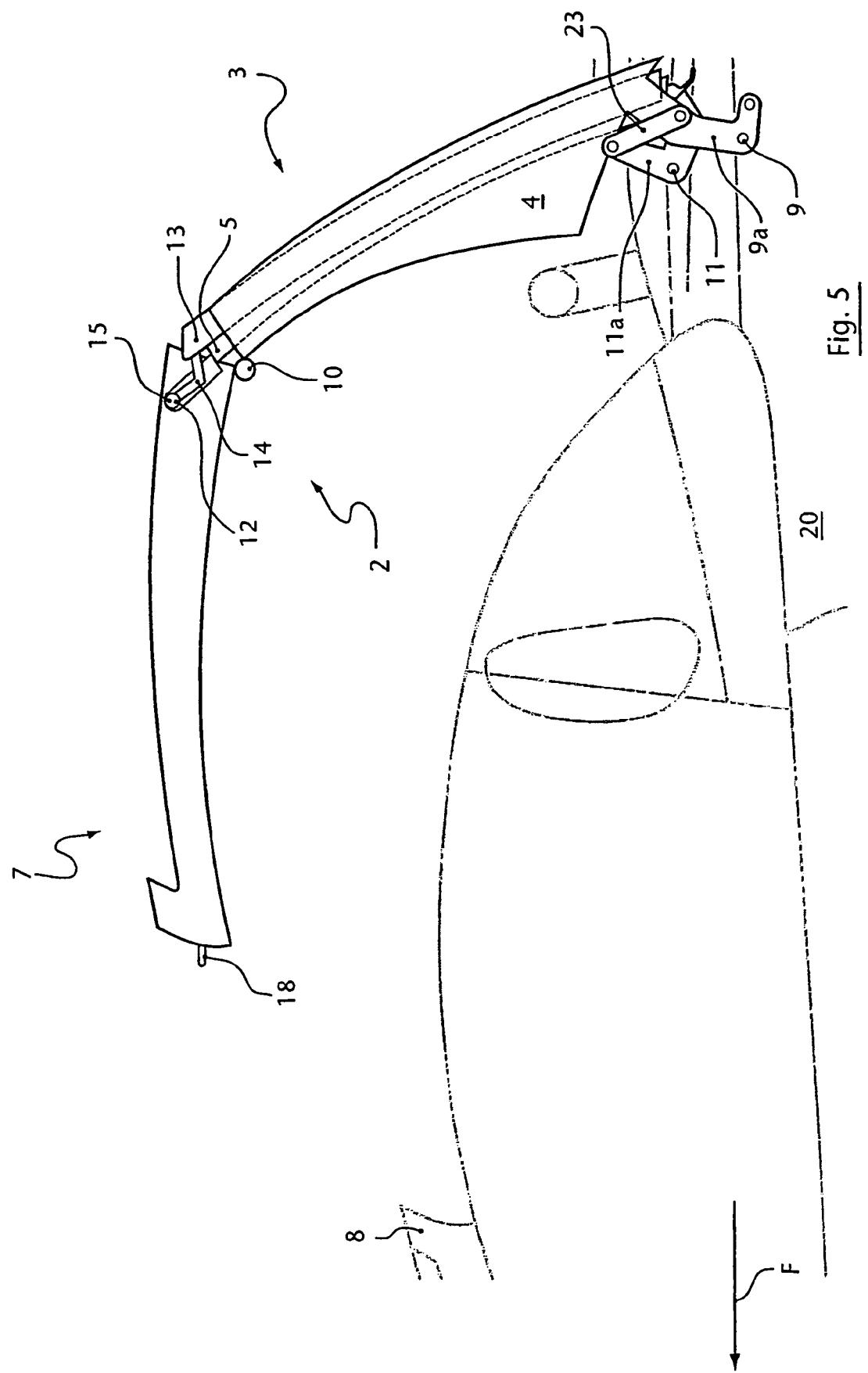
FIG. 5 shows the roof as it is being opened.
Figure 6:
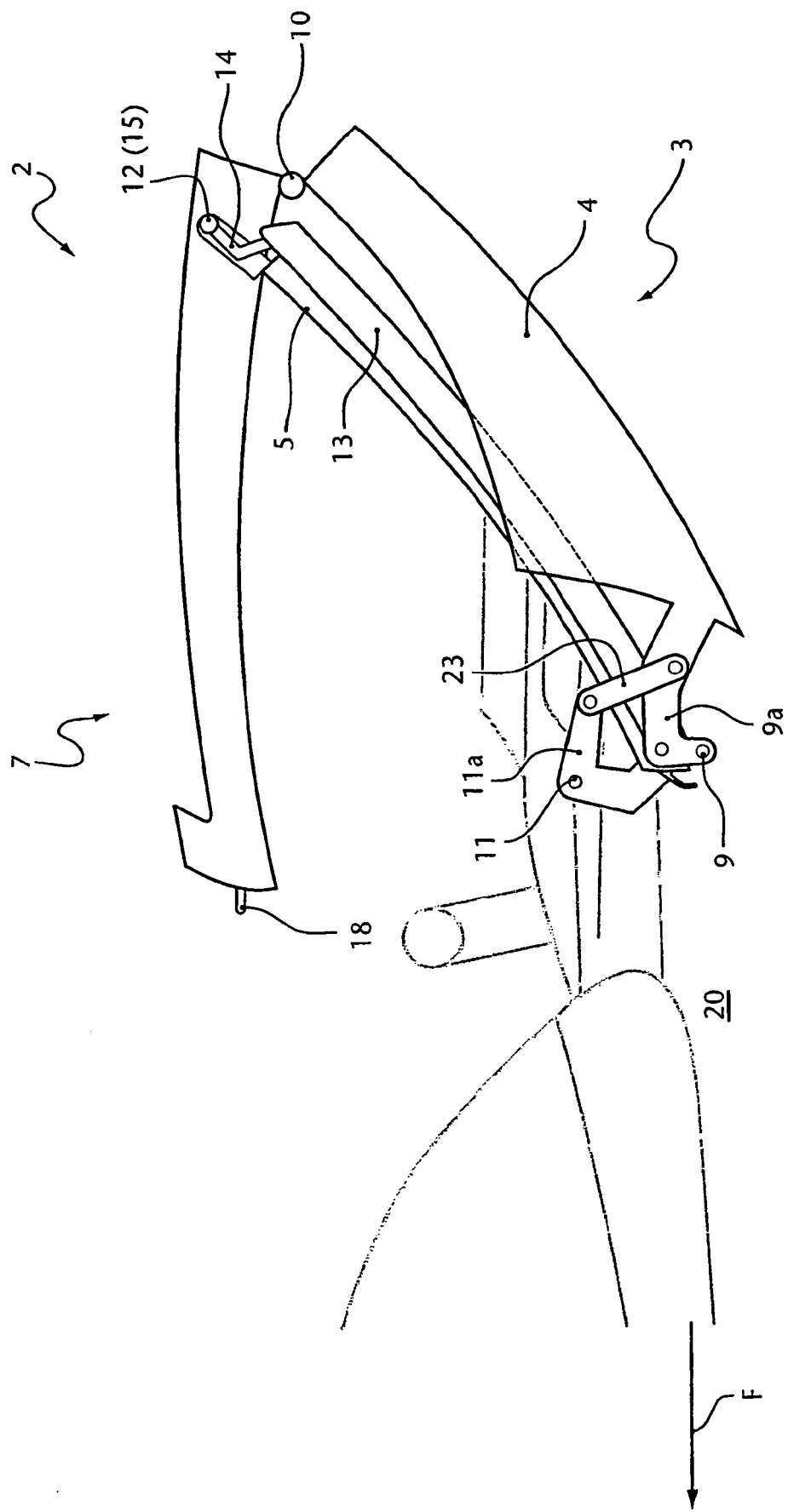
FIG. 6 shows a view similar to that of FIG. 5 with the roof opening progressing further.
Figure 7:
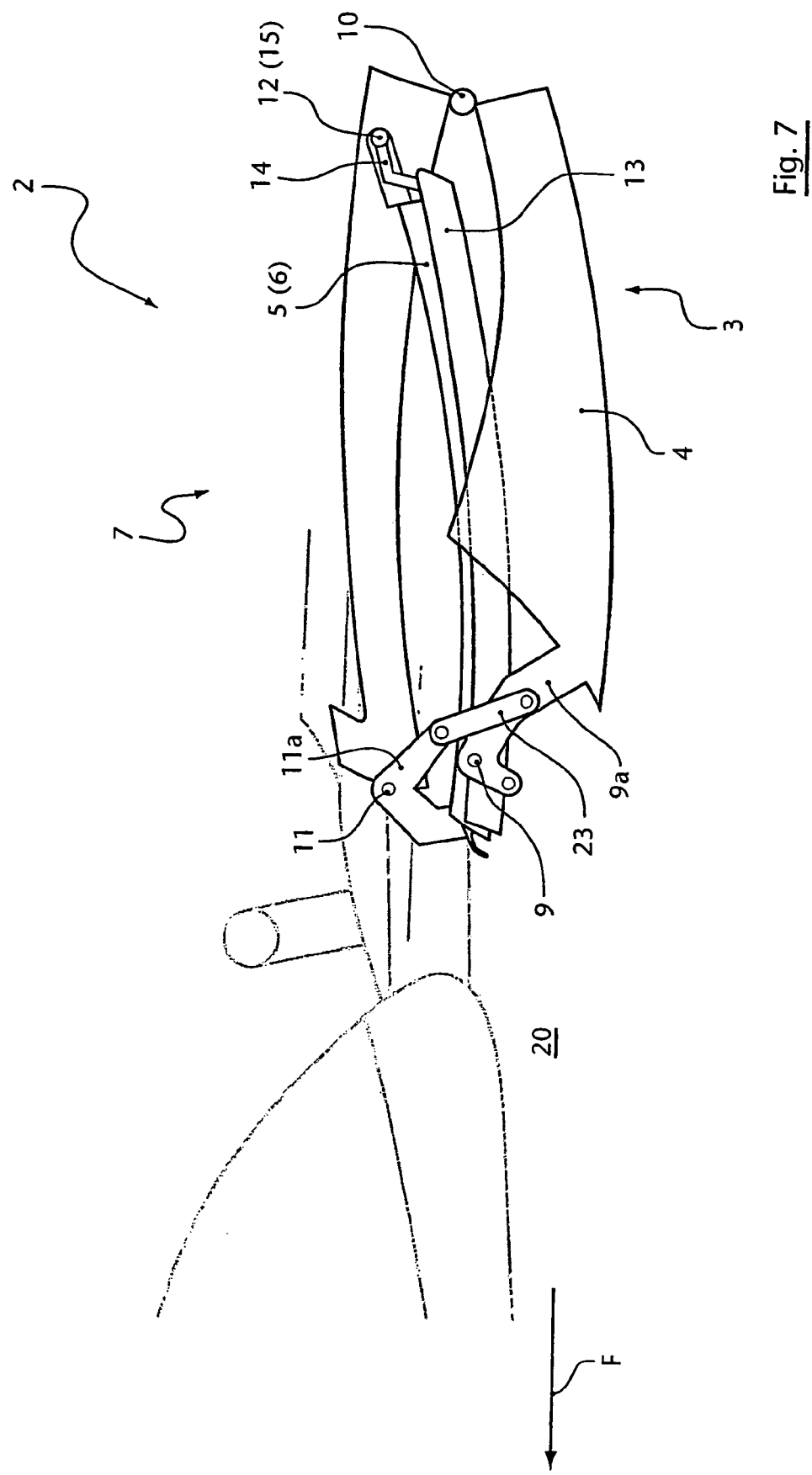
FIG. 7 shows the roof according to FIG. 6 in the completely open position, lowered in the rear area of the vehicle.
Figure 8:
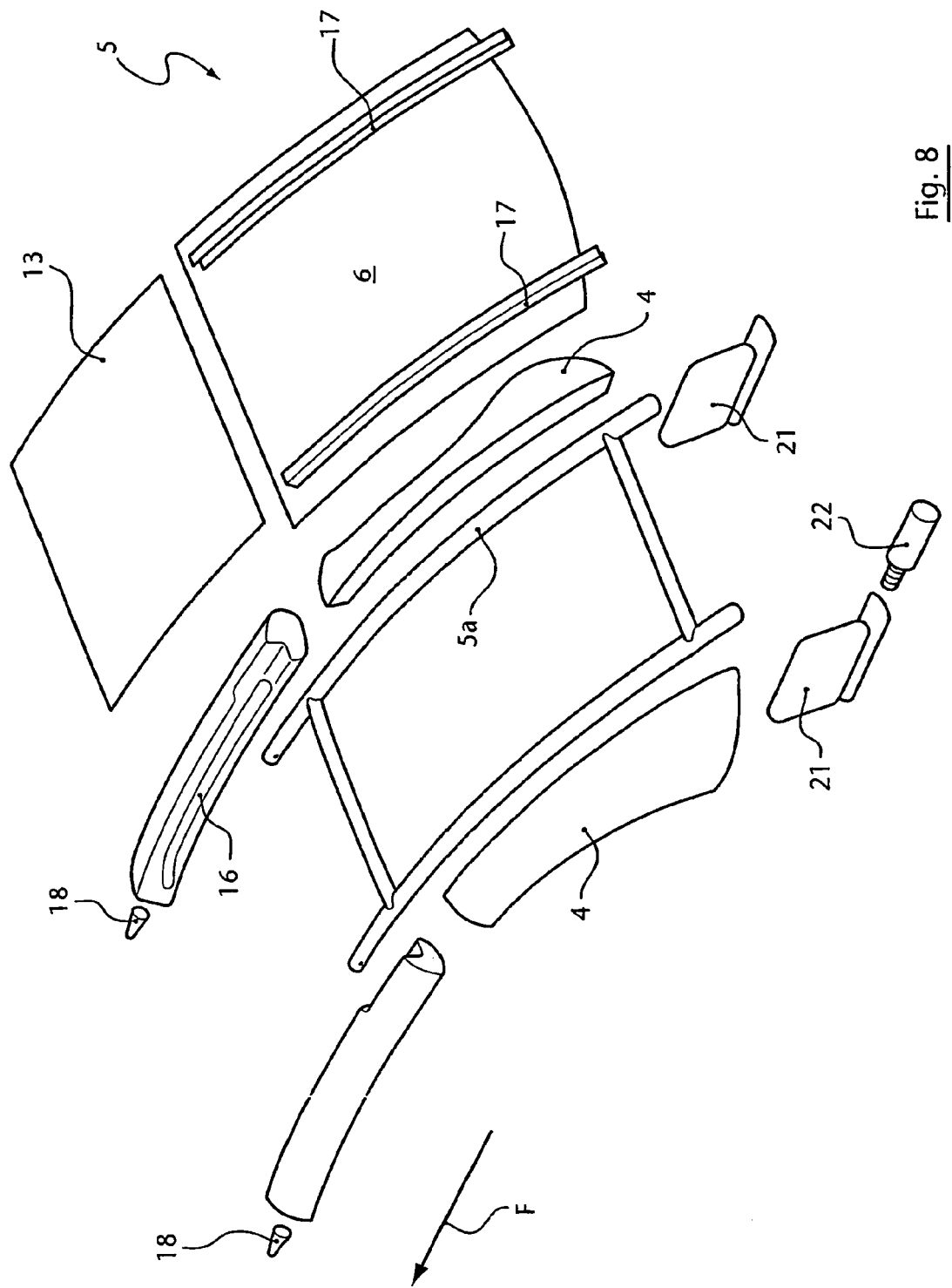
FIG. 8 shows a perspective exploded view of the roof with the plate section provided in the upper roof part.
Figure 9:
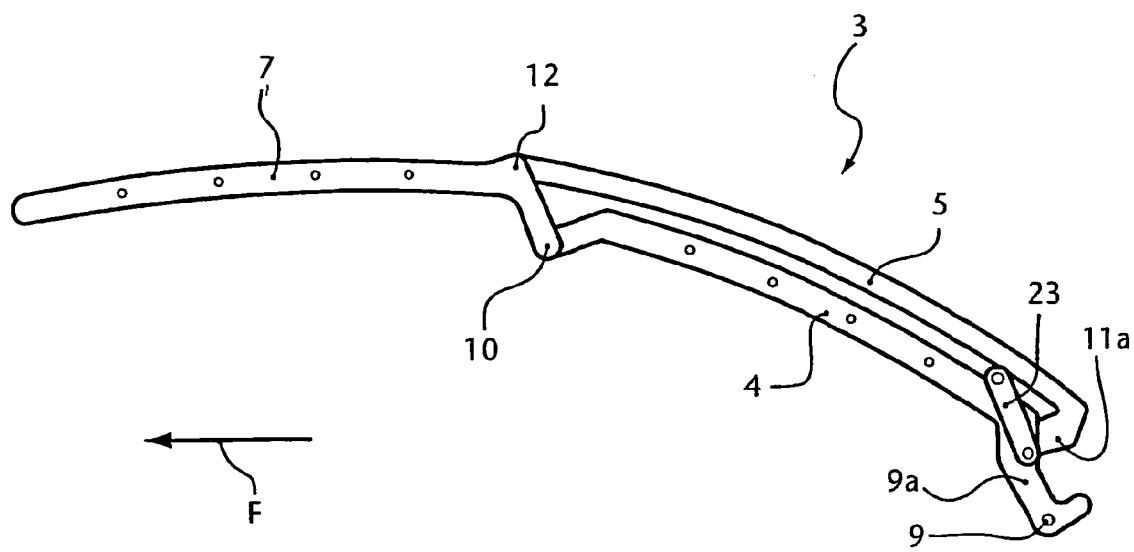
FIGS. 9 to 12 show a simplified systematic side view of the moving parts critical to the lowering of the roof without consideration of drives, gears, or a sunroof.
Figure 10:
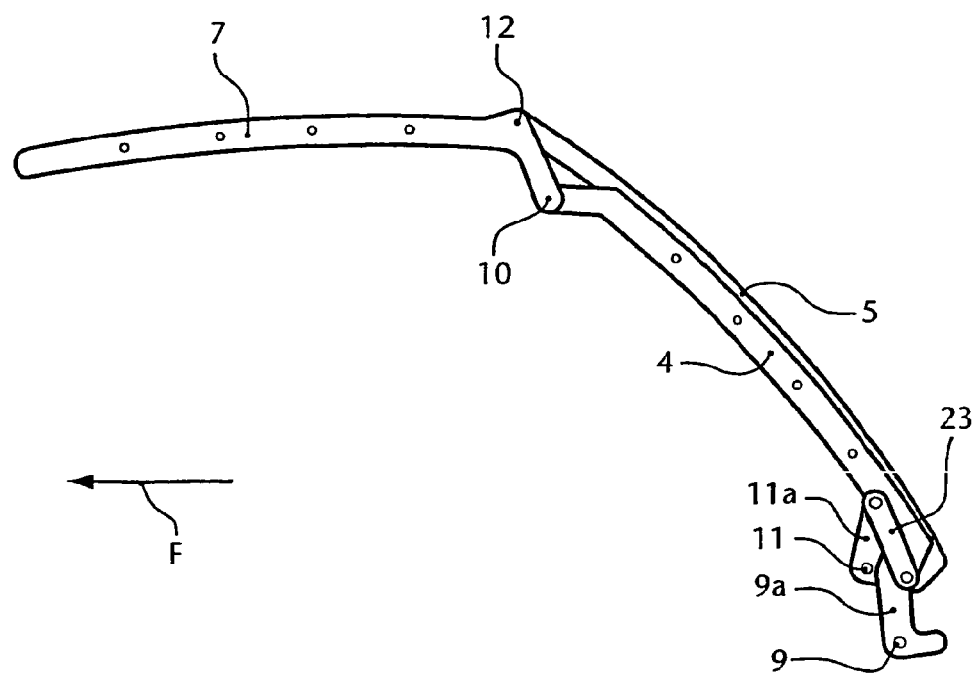
Figure 11:
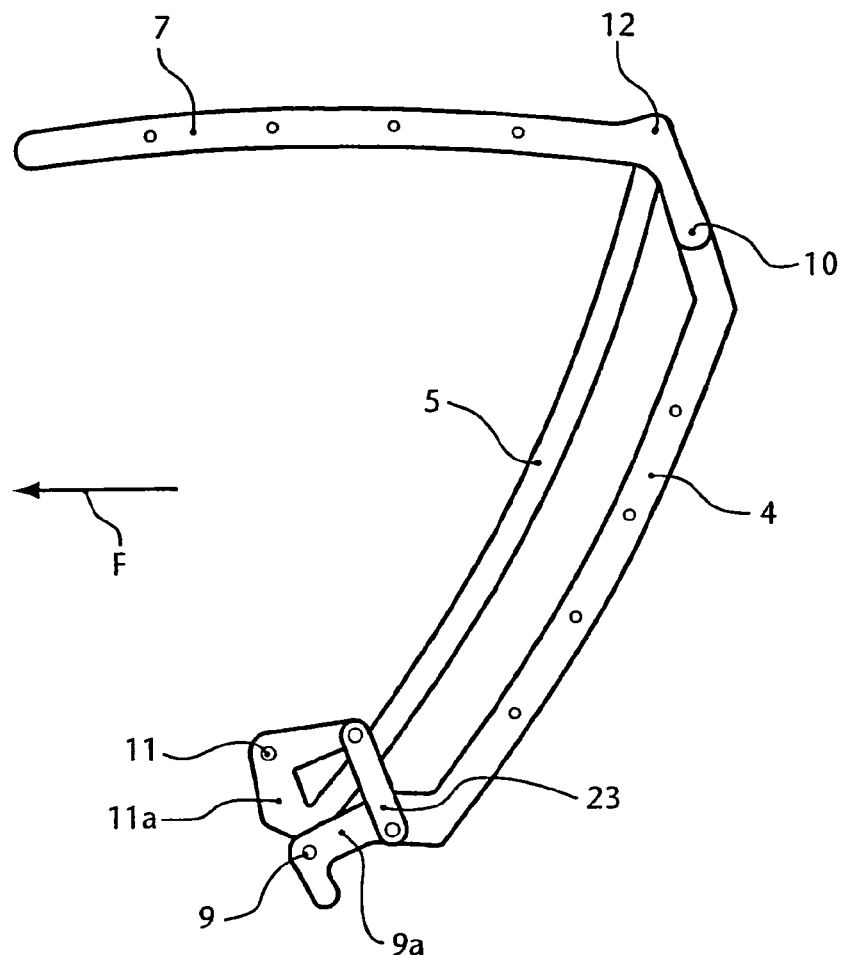
Figure 12:
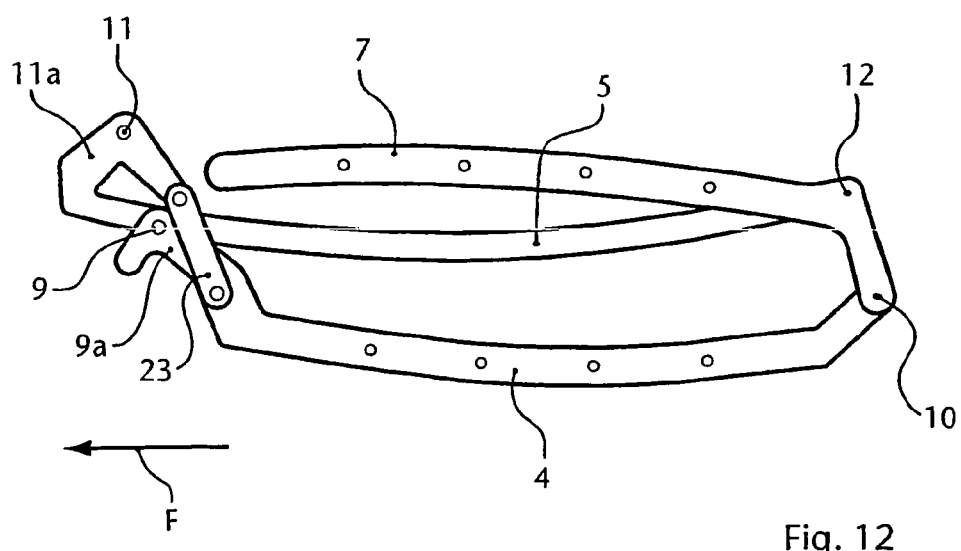

To open the roof 2 from the closed position (FIG. 1) to a completely open position (FIG. 7)—without the option of the roof 2 that can be moved as a whole—the arms 9a and 11a are first simultaneously swiveled by the force of the drive 24 (FIG. 3) towards the rear about the bearings 9, 11, which are fixed with respect to the automobile body (FIG. 5 to FIG. 7). In the version illustrated in FIGS. 1 to 13, the sunroof 13 must be completely open during the opening of the roof 2. In the example shown here, before the operation of opening the roof is started, the sunroof 13 is first opened by guiding the arms 14 in the guideways 16 and guiding the plate member 13 in the guide rails 17 of the rear roof part 3 in such a way that in the completely open position of the sunroof, the bearing journals 15 are coaxial with the pivot axis of the pivot joint 12 (FIG. 4, ff.). In this process, the bearing journals 15 continue to be held in the guideways 16, so that they do not have to overcome a step or a misalignment as the sunroof 13 is slid open. Since the middle section 5 and the roof part 7 swivel towards each other on the joint 12, during this swiveling, the plate member 13 can be held motionless parallel to the rear window 6, which is part of the middle section 5, and yet remain with the arms 14 in the guideways 16 of the front roof part 7.

During the swiveling open of the roof parts 3 and 7, the middle section 5 passes through the extension plane of the main posts 4 due to the height shift of the planes of the joints 9 and 10, on the one hand, and 11 and 12, on the other hand. The long sides of the articulated parallelogram, formed by the main posts 4 and the middle section 5, completely fold towards each other, so that at the end, the parallelogram orientation has changed. In this way, the middle section 5 arrives in a lowered position in the automobile body 20 above the main posts 4 (FIG. 7). This is very advantageous, because it results in additional storage space under the middle section 5 with the rear window 6.

With the option of a horizontal displacement of the whole roof 2, the roof 2 would first be moved towards the rear (FIG. 13) before the movement to swivel it open is initiated and can then be moved back towards the front after the roof has been completely opened.

The complete folding of the parallelogram is brought out again in the schematic overview in FIGS. 9 to 12. The essentially rod-shaped parts shown in this series of drawings were provided with the reference numbers 4, 5, and 7 for the corresponding overall parts for the purpose of simplification, since, where the sequence of movements is concerned, it does not matter how any of the supporting frame parts for the specified units 4, 5, 7 are designed. The sunroof 13 also plays no role in the basic sequence of movements illustrated here. As the drawings show, additional links beyond parts 4 and 5 are not necessary. The parallelogram is closed by the roof part 7 that connects the pivot joints 10 and 12 without there being any need for a separate part here. The head clearance thus remains unrestricted. With the complete swiveling of the parallelogram, one achieves, on the one hand, sealed contact between the middle section 5 and the main posts 4 with the roof 2 closed and, on the other hand, mounting of the middle section 5 in an elevated plane to increase the trunk space.

Figure 17:
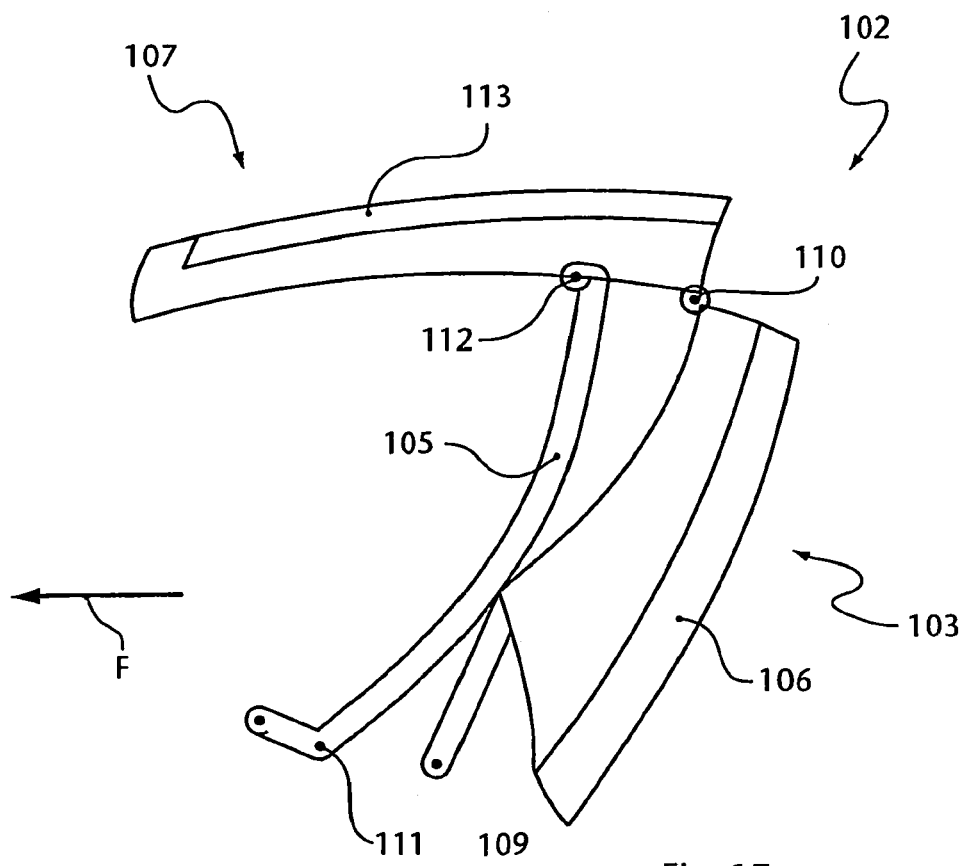
FIG. 17 shows the alternative folding roof design according to FIG. 14 as the roof is being opened with the sunroof closed.
Figure 18:
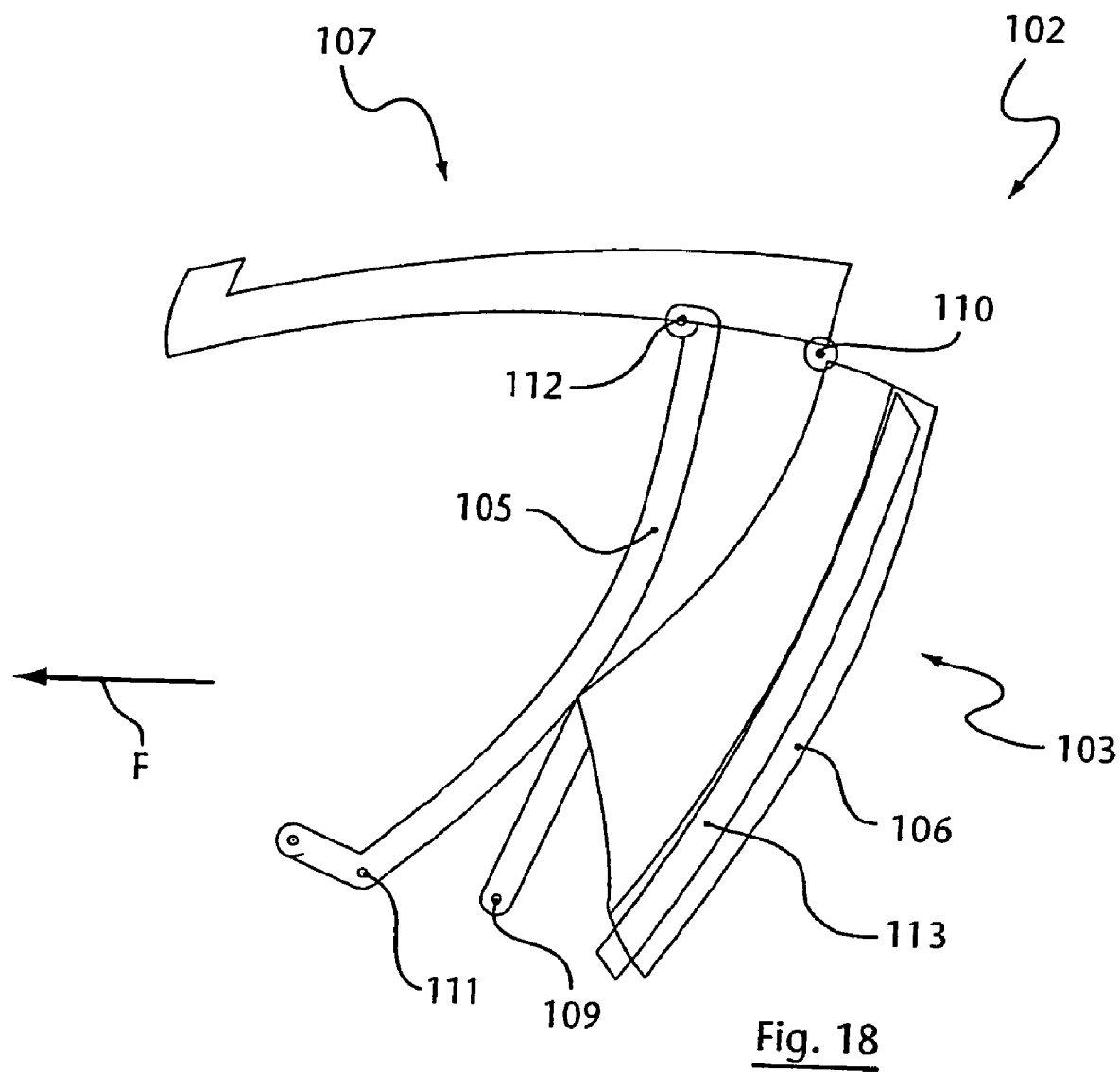
FIG. 18 shows the alternative folding roof design according to FIG. 14 as the roof is being opened with the sunroof open.

FIGS. 14 to 18 show another embodiment of a two-part folding roof 102, in which a rear roof part 103 is designed as a single part, so that the rear window 106 is permanently connected with lateral main posts 104. As especially FIGS. 17 and 18 show, the rear roof part 103 forms a main link. As is well known from the parent document, another link 105 is arranged in front of this main link in the direction of travel F. The link 105, on the one hand, and the roof part 103, on the other hand, thus form an articulated parallelogram, connected above by the joints 112 and 110 and the rear section of the front roof part 107, and rotatably supported in the lower section on the automobile body 20 on the bearings 109 and 111. In this embodiment, the automobile body 20 can be designed almost the same as the automobile body of the first embodiment. In the roof 102, on the other hand, the additional link 105 is necessary due to the fixed connection of the rear window 106 to the main posts 104. Instead of the elevated joint 12 of the first embodiment, the joint 112 is located in a low position, so that in the second embodiment, a displacement of the sunroof 113 below the rear window 106 is advantageous. In a difference from the first embodiment, when the sunroof 113 is opened (transition from FIG. 14 to FIG. 16), it is transferred completely from the front roof part 107 to a guide of the rear roof part 103. Therefore, the roof 102 can be swiveled open both with the sunroof 113 completely closed (FIG. 17) and with the sunroof 113 completely open (FIG. 18).

In both embodiments, the sunroof 13, 113 can be moved while driving. As long as the roof 2, 102 remains in an otherwise closed position, partial opening of the sunroof 13, 113 is also possible at all times.

The invention can be used both in vehicles with manually moved roofs and in vehicles with fully automatically or semiautomatically moved roofs 2, 102. It is also possible to provide drives only for the horizontal movement H and/or for the sunroof 13, 113 and to carry out the folding or unfolding of the roof 2, 102 manually.

The invention claimed is:

1. Convertible (1) with a roof (2; 102) that consists of rigid parts and comprises at least a rear roof part (3; 103) and an upper roof part (7; 107), which in the closed state of the roof is arranged above a passenger compartment and in front of the rear roof part in the direction of travel (F), wherein the upper roof part (7; 107) comprises an at least essentially transparent plate member (13; 113), which can be moved horizontally in a direction opposite the direction of travel (F), is supported in its open position parallel to a rear window (6; 106) enclosed by the rear roof part (3; 103), and can be moved in this parallel position with the roof (2; 102) to open or close the roof, and in this process the plate member (13; 113), in both the open position and in the closed position, is held by its front end region (14) in a guide (16) assigned to the upper roof part (7) and by its rear end region (14*a*) in a guide (17) assigned to the rear roof part (3).

2. Convertible (1) with a roof (2; 102) that consists of rigid parts and comprises a rear roof part (3; 103) and an upper roof part (7; 107), which in the closed state of the roof is arranged above a passenger compartment and in front of the rear roof part in the direction of travel (F), wherein the upper roof part (7; 107) comprises an at least essentially transparent plate member (13; 113), which extends at least almost over the entire length of the upper roof part (7; 107), can be moved horizontally in a direction opposite the direction of travel (F), is supported in its open position parallel to a rear window (6; 106) enclosed by the rear roof part (3; 103), and, to open or close the roof, can be moved in this parallel position with the roof (2; 102) in such a way that the rear roof part, in order to open it, can be swiveled into the automobile body, such that the surface of the rear roof part that forms the outside when the roof is closed faces downward when the roof is in its lowered position.

3. Convertible in accordance with claim 2, wherein a front end region of the plate member (13) in the open position is held by means of arms (14) coaxially with an axis of a pivot joint (12), which joins the rear roof part (3) and the upper roof part (7).

4. Convertible (1) in accordance with claim 1, wherein the roof (2) can be moved by means of an articulated parallelogram assigned to the rear roof part (3), wherein the rear roof part (3) is divided into lateral main posts (4) and a middle section (5) that lies between them and encloses the rear window (6), such that the main posts (4), on the one hand, and the middle section (5) on the other hand, form parts of the articulated parallelogram.

5. Convertible in accordance with claim 4, wherein a joint (11) of the middle section (5) with the automobile body (20) and a joint (12) of the middle section (5) with the upper roof part (7) are each located above planes of the joints (9; 10) of the main posts (4), and in the open state, the rear window (6) is held above the main posts (4).

6. Convertible in accordance with claim 1, wherein the plate member (13) can be moved over the rear window (6), and an upwardly projecting sealing edge is assigned to the upper edge of the rear roof part (3), and a downwardly directed opposing edge that grips behind a sealing edge of the rear roof part (3) is assigned to the rear edge of the plate member (13).

7. Convertible in accordance with claim 2, wherein the plate member (113) is completely supported on the upper roof part (107) in the closed state and is completely supported on the rear roof part (103) in the open state.

8. Convertible in accordance with claim 7, wherein the roof (102) can be moved both with the plate member (113) open and with the plate member (113) closed.

9. Convertible in accordance with claim 1, wherein the roof (2; 102) can be moved at least practically horizontally between a closed position, in which the upper roof part (7; 107) is supported indirectly or directly on a windshield frame (8), and an intermediate position, in which the mounting connection between the roof (2; 102) and the windshield frame (8) is released.

10. Swiveling roof (2; 102) for a convertible (1) in accordance with claim 1.

* * * * *